US00RE36326E

United States Patent [19]

Ito et al.

[11] E Patent Number: Re. 36,326

[45] Reissued Date of Patent: Oct. 5, 1999

[54] ZOOM LENS SYSTEM

[75] Inventors: Takayuki Ito, Tokyo; Sachio Hasushita, Hokkaido; Shuji Yoneyama, Tokyo, all of Japan

[73] Assignee: Asahi Kogaku Kogyo Kaisha, Tokyo, Japan

[21] Appl. No.: 08/584,309

[22] Filed: Jan. 11, 1996

Related U.S. Patent Documents

Reissue of:

[64] Patent No.: 5,278,699
Issued: Jan. 11, 1994
Appl. No.: 07/907,796
Filed: Jul. 2, 1992

[30] Foreign Application Priority Data

Jul. 4, 1991 [JP] Japan ..... 3-261482
Apr. 16, 1992 [JP] Japan ..... 4-96802

[51] Int. Cl.[6] ..... G02B 15/14
[52] U.S. Cl. ..... 359/692
[58] Field of Search ..... 359/689, 692, 359/690, 687, 688, 691

[56] References Cited

U.S. PATENT DOCUMENTS

| | | | |
|---|---|---|---|
| 4,983,027 | 1/1991 | Kojima et al. | 359/689 |
| 5,082,360 | 1/1992 | Sato et al. | 359/692 |
| 5,109,299 | 4/1992 | Kato | 359/692 |
| 5,164,859 | 11/1992 | Ito | 359/692 |
| 5,168,403 | 12/1992 | Umeda et al. | 359/692 |
| 5,424,871 | 6/1995 | Ito et al. | 359/689 |

*Primary Examiner*—Scott J. Sugarman
*Attorney, Agent, or Firm*—Greenblum & Bernstein P.L.C.

[57] ABSTRACT

A zoom lens system for a compact camera, having a zoom ratio of approximately 2 or 3 and a smaller overall lens length at the telephoto end than the focal distance at the telephoto end, and which optically experiences only a small focus shift due to environmental changes such as temperature or humidity. The zoom lens system includes a positive lens group and a negative lens group. A positive plastic lens element is disposed in either the positive lens group or the negative lens group. The magnification of the system is adjusted by varying [the] *a* distance between the positive and negative lens groups. The zoom lens system satisfies the following conditions:

$$0.9<f_t/f_p<1.6 \quad (1)$$

$$0.6<m_p'-m_p<1.2 \quad (2)$$

$$[2.9<]\ 3.13\leq m_{MAX}<4.0 \quad (3)$$

where $f_t$ is the focal length of the overall system at the telephoto end, $f_p$ is the focal length of the positive plastic lens element, $m_p$ is the lateral magnification at the telephoto end of the lens group which includes the positive plastic lens element and which is positioned closer to the image than the positive plastic lens element, $m_p'$ is the lateral magnification at the telephoto end of the lens group which does not include the positive plastic lens element and which is positioned closer to the image than the positive plastic lens element, and $m_{MAX}$ is the lateral magnification at the telephoto end of the lens group having a maximum magnification.

10 Claims, 8 Drawing Sheets

ZOOM LENS SYSTEM

Matter enclosed in heavy brackets [ ] appears in the original patent but forms no part of this reissue specification; matter printed in italics indicates the additions made by reissue.

BACKGROUND OF THE INVENTION

This application is based on and claims priority from Japanese application No. HEI P03-261482 and Japanese application No. P04-96802, the disclosures of which are incorporated by reference herein.

The present invention relates to a zoom lens system which is highly susceptible to temperature and humidity variations. More particularly, the present invention relates to a telephoto-type, two-group or three-group zoom lens system for use with a compact camera, which has a shorter back focus than the zoom lens system for a single-lens reflex camera.

Heretofore, numerous telephoto-type two- or three-group zoom lens systems having a zoom ratio of about 2 or 3 have been known for use with compact cameras. Conventional zoom lens systems have an overall lens length (distance from the first surface to the image plane) at the narrow-angle or telephoto end which is greater than the focal length at the telephoto end.

However, if a zoom lens system whose overall length is greater than its focal length is assembled in a camera, the overall size of the equipment is not sufficiently compact. Thus, a smaller-sized zoom lens system is desired.

Accordingly, each of the lens groups used must be set to have a large power. However, if the power of each lens group is increased, a substantial amount of defocussing (e.g., focus shift) will occur if the lens barrel is even minutely deformed due to temperature or humidity changes. Compact cameras are typically equipped with a range finding optical system separate from the imaging lens system, and the focus adjusting position of the imaging lens system is prefixed with respect to the distance to the object. Therefore, if defocussing as described above results, it cannot be corrected and unfocused pictures are obtained.

SUMMARY OF THE INVENTION

The present invention was designed in view of these problems of the conventional systems. An object of the invention is to provide a compact zoom lens system whose overall lens length at the telephoto end is smaller than its focal distance at the telephoto end and which optically experiences only a small focus shift, e.g., defocussing, in response to an environmental change such as, for example, temperature or humidity.

The zoom lens system of the present invention includes at least two lens groups including a positive lens group and a negative lens group, and has a positive plastic lens element in either the positive lens group or the negative lens group. The system's magnification is adjusted by varying the distance between the positive and negative lens groups. The zoom lens system satisfies the following conditions:

$$0.9<f_t/f_p<1.6 \quad (1)$$

$$0.6<m_p'-m_p<1.2 \quad (2)$$

$$2.9<m_{MAX}<4.0 \quad (3)$$

where $f_t$ is the focal length of the overall system at the telephoto end;

$f_p$ is the focal length of the positive plastic lens element;

$m_p$ is the lateral magnification at the telephoto end of the lens group which includes the positive plastic lens element and which is positioned closer to the image than the positive plastic lens element;

$m_p'$ is the lateral magnification at the telephoto end of the lens group which does not include the positive plastic lens element and which is positioned closer to the image than the positive plastic lens element; and $m_{MAX}$ is the lateral magnification at the telephoto end of the lens group having a maximum magnification.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENTS

Figure 1:
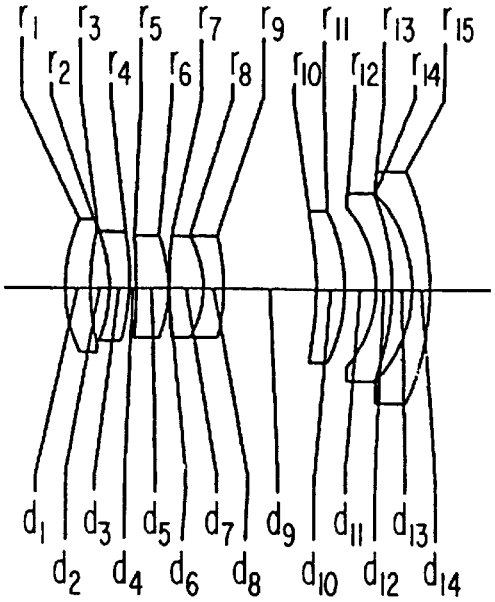
FIG. 1 is a simplified cross-sectional view showing the zoom lens system of Example 1 at the wide-angle end.
Figure 2:
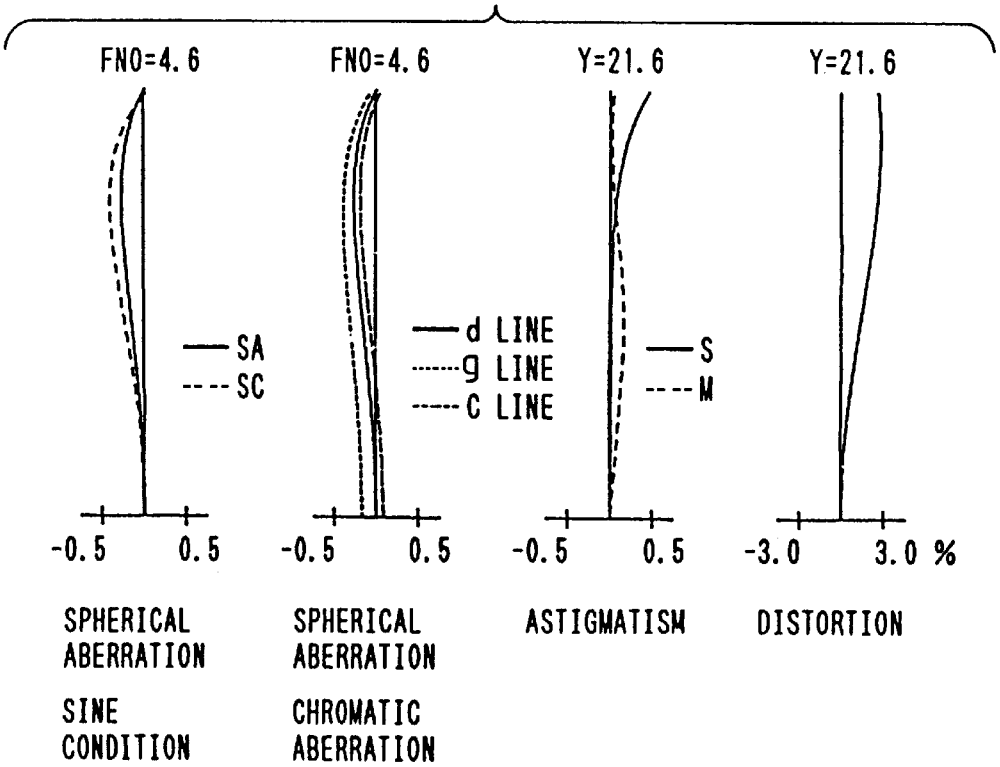
FIG. 2 is a set of graphs plotting the aberration curves obtained with the zoom lens system of Example 1 at the wide-angle end.
Figure 3:
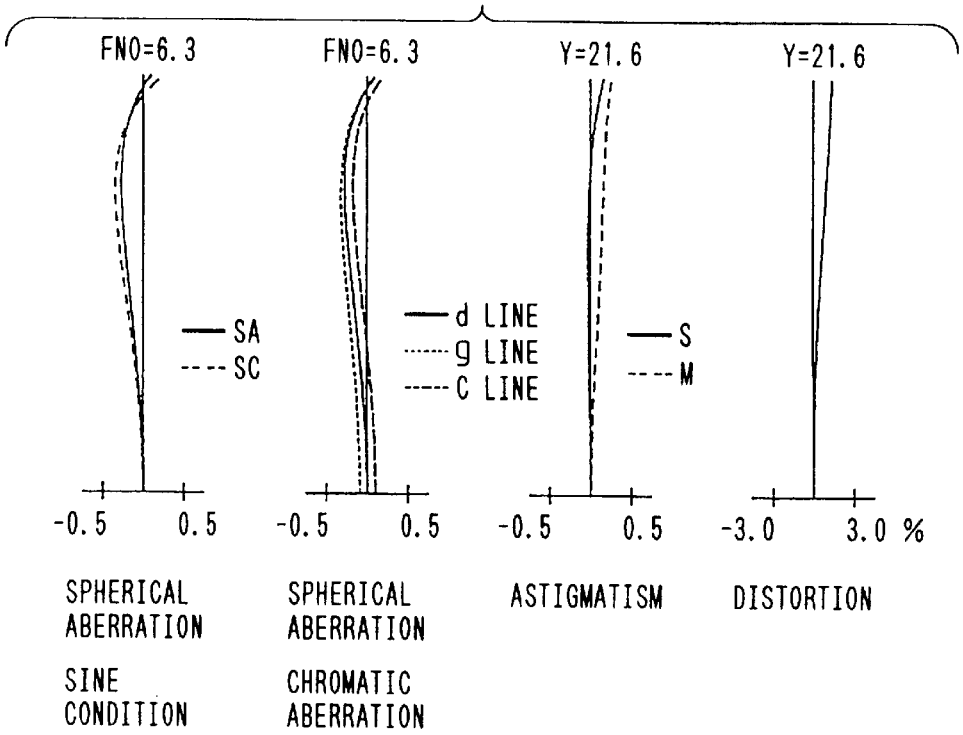
FIG. 3 is a set of graphs plotting the aberration curves obtained with the zoom lens system of Example 1 at the intermediate-angle end.

Conditions to be satisfied by the lens system according to the present invention are set forth in the Summary above.

Several nonlimiting examples of the present invention are described below and illustrated in the accompanying drawings.

When the temperature or humidity increases, the lens barrel expands to increase the distance between lenses or lens groups housed in the lens barrel. Therefore, in a telephoto-type two- or three-group zoom lens system, the focus will change in a minus direction. Particularly when the overall lens length is shortened, the power of each lens group increases, as does the focus shift. Conversely, if the positive lens element is formed of plastic, the focus will change in a plus direction in response to increased temperature or humidity. Therefore, the focus shift due to expansion or contraction of the lens barrel can be canceled by having a positive plastic lens element in either one of the lens groups in the zoom lens system of the present invention.

If the power of each lens group is increased to shorten the overall lens length, the positive lens element in the positive lens group is prone to having a greater power, and if this positive lens element is formed of plastic, the focus will be overcorrected. Hence, if a plastic lens element is to be included in the positive lens group, a positive plastic lens element solely functioning to compensate for environmental variations must be provided along with the existing positive lens element.

Under these circumstances, the zoom lens systems in accordance with the examples to be described hereunder are composed of either two lens groups (positive and negative) or three lens groups (positive, positive and negative), with a positive plastic lens element being provided in the negative lens group. The positive lens element is advantageously included in the negative lens group since its power can be made comparatively smaller than when the positive lens element is disposed in the positive lens group. Hence, a positive plastic lens element of a small power is preferably used in the negative lens group to ensure that environmental compensation is achieved while simultaneously correcting for chromatic and other aberrations.

If the plastic lens element is positioned closest to the object relative to all the elements in the negative lens group, the diameter of the lens can be reduced, and simultaneously aberrations can be compensated for adequately.

If desired, a positive or negative lens element having a small power may be disposed, fixedly or movably behind the negative lens group.

Condition (1) specifies the ratio of the focal length of the overall system to the focal length of the plastic lens element. If the upper limit of this condition is exceeded, the power of the plastic lens element becomes excessive and the focus shift $\Delta p_1$ due to the focal length variation of the plastic lens element increases.

If the lower limit of condition (1) is not reached, the power of the plastic lens element becomes so small that effectively correcting aberrations within the negative lens group is difficult. Simultaneously, the focus shift $\Delta p_1$ due to the focal length variation of the plastic lens element will decrease, making it impossible to cancel the focus shift $\Delta p2$ due to the variation in the distance between the lens groups resulting from expansion or contraction of the lens barrel.

Conventionally, a plastic lens has been used as a positive lens element in the positive or negative lens group. However, such a positive plastic lens element has a very small power which is less than the lower limit of condition (1), and if the power of each lens group is increased to shorten the overall lens length, it is impossible to cancel the focal variation occurring due to expansion or contraction of the lens barrel.

A positive plastic lens element also has been paired with a negative plastic lens element to cancel the focal variation of the plastic lenses per se. However, the present invention adopts a different approach in which the focal variation of the positive plastic lens element cancels the focal variation resulting from the expansion or contraction of the lens barrel without using a negative plastic lens element.

Condition (2) is associated with condition (1) in specifying directly the defocussing that occurs in the plastic lens element in response to environmental changes. If the upper limit of this condition is exceeded, the defocussing becomes excessive. If the lower limit of condition (2) is not reached, the focus shift $\Delta p_1$ becomes so small that canceling the focus shift $\Delta p_2$ that occurs due to the expansion or contraction of the lens barrel is impossible.

Condition (3) specifies the lateral magnification of the lens group having the highest magnification and which must be satisfied to provide a compact overall system. If the upper limit of this condition is exceeded, the powers of both the first and second lens groups become excessive, greatly varying aberrations upon zooming. If the lower limit of condition (3) is not reached, the power of each lens group becomes so weak that the overall lens length will increase.

Each of the zoom lens systems according to Examples 1–3 described below is composed of a positive first lens group and a negative second lens group, with a positive plastic lens element being positioned closest to the object relative to all elements of the second lens group.

If the zoom lens system is composed of two lens groups, one being positive and the other negative, the following condition (4) is preferably satisfied:

$$2.9<m_2<3.7 \tag{4}$$

where $m_2$ is the lateral magnification of the second lens group at the telephoto end.

Condition (4) specifies the same parameter as does condition (3) except that it is particularly directed to when the overall system is composed of two lens groups.

The zoom lens system according to Example 4 has three lens groups, the first two being positive and the third being negative, and the magnification of the system is adjusted by varying the distance between the first and second lens groups and the distance between the second and third lens groups.

If the zoom lens system has three lens groups, the following condition (5) is preferably satisfied:

$$3.0<m_3<4.0 \tag{5}$$

where $m_3$ is the lateral magnification of the third lens group at the telephoto end.

Condition (5) corresponds to condition (3) and is preferably satisfied to shorten the overall lens length.

Hereunder, the focal variation due to temperature changes is described specifically. If the focal length change due to temperature variations of the plastic lens element is $\Delta fp$, the resulting focus shift $\Delta p_1$ is expressed by:

$$\Delta p_1=(m_p'-m_p)^2\cdot\Delta f_p$$

In a two-group zoom lens system, the focus shift $\Delta p_2$ due to variations in the distance between lens groups is expressed by:

$$\Delta p_2=-m_2^2\cdot\Delta dt$$

where $m_2$ is the lateral magnification of the second lens group at the telephoto end and $\Delta dt$ is the change in the distance between the first and second lens groups.

In a three-group zoom lens system, the same parameter is expressed by:

$$\Delta p_2=-(m_{23}^2\cdot\Delta dt_{12}+m_3^2\cdot\Delta dt_{23})$$

where $m_{23}$ is the composite lateral magnification second and third lens groups at the telephoto end, $m_3$ is the lateral magnification of the third lens group at the telephoto end, $\Delta dt_{12}$ is the change in between the first and second lens groups, and $\Delta dt_{23}$ is the change in the distance between the second and third lens groups.

The focal length of the plastic lens element changes by approximately +1% when the temperature changes by +30° C. As calculated for the distance between lens groups ($\Delta dt$, $\Delta dt_{12}$, or $\Delta dt_{23}$), the lens barrel expands or contracts by approximately +1 to 1.5 $\mu$m in response to a temperature change of +1° C.

The plastic lens element in each of the two-group zoom lens systems according to Examples 1–3 has a focal length ($f_p$) of approximately 50 mm, with lateral magnifications of $m_{2p}$(=$m_2$=3.2) and $m_{2p}$'(=4.1). Given this data, the change in focal length $\Delta f_p$ due to a temperature change of +30° C is 0.5 mm and the shifts in focal position $\Delta p_1$ and $\Delta p_2$ will be as follows:

$$\Delta p_1 \text{™} 0.4$$

$$\Delta p_2 \text{™} -0.3 \text{ to } -0.5.$$

Thus, the mutual effects of the two focus shifts cancel each other to effectively suppress the defocussing of the overall system.

The data for the three-group lens system shown in Example 4 are: $f_p$=73.5 mm; $m_{3p}$=$m_3$=3.56;$m_{3p}$'=4.39; and $m_{23}$=2.09. Hence, the shifts in focal positions $\Delta p_1$ and $\Delta p_2$ will be as follows:

$$\Delta p_1 \cong 0.5$$

$$\Delta p_2 \cong -0.5 \text{ to } -0.75.$$

EXAMPLE 1

Figure 4:
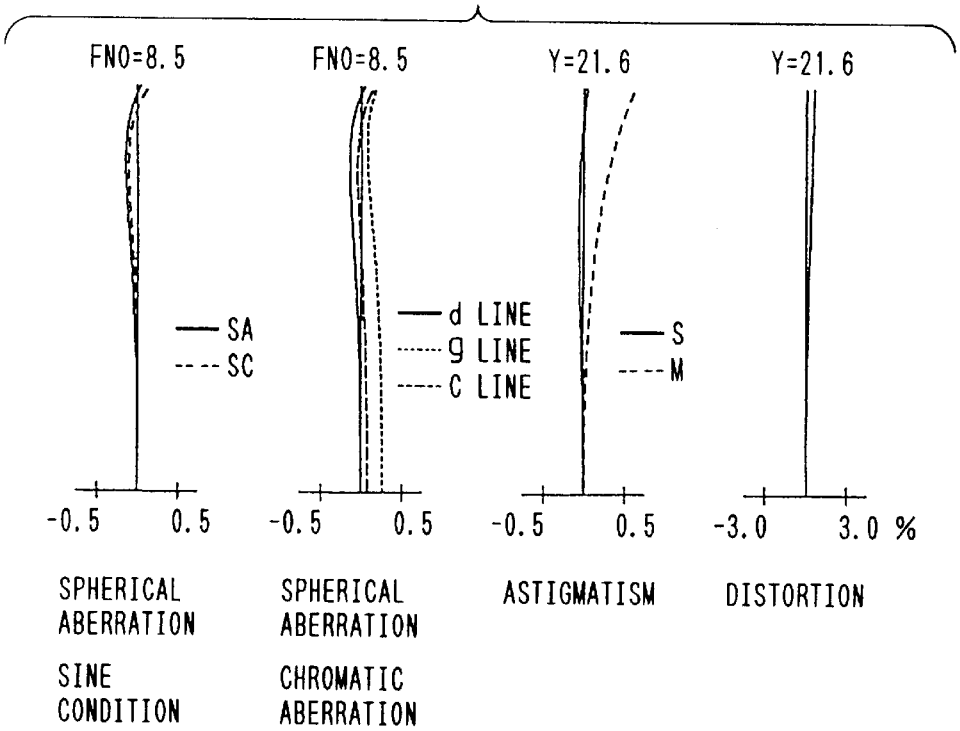
FIG. 4 is a set of graphs plotting the aberration curves obtained with the zoom lens system of Example 1 at the telephoto end.

FIG. 1 illustrates the zoom lens system of Example 1 of the present invention. Specific numerical data for this system are given in Tables 1 and 2. FIG. 4 illustrates graphs plotting the aberration curves obtained with this system at the wide-angle end, the intermediate-angle end and the telephoto end, respectively. In Tables 1 and 2, r denotes the radius of curvature of an individual lens surface, d is the air space between lens surfaces, N is the refractive index, ν is the Abbe number, f is the focal length, fB is the back focus, F No. is the aperture ratio, and ω is the half-view angle.

TABLE 1

| Surface No. | r | d | N | ν |
|---|---|---|---|---|
| 1 | 12.252 | 2.15 | 1.54072 | 47.2 |
| 2 | 19.524 | 1.54 | | |
| 3 | −11.734 | 1.74 | 1.84666 | 23.8 |

TABLE 1-continued

| Surface No. | r | d | N | ν |
|---|---|---|---|---|
| 4 | −26.546 | 0.50 | | |
| 5 | −53.292 | 2.59 | 1.53172 | 48.9 |
| 6 | −11.845 | 0.10 | | |
| 7 | 41.762 | 2.80 | 1.56732 | 42.8 |
| 8 | −8.050 | 1.63 | 1.83400 | 37.2 |
| 9 | −16.685 | variable | | |
| 10 | −23.722 | 2.29 | 1.58547 | 29.9 |
| 11 | −13.547 | 2.64 | | |
| 12 | −9.495 | 1.33 | 1.77250 | 49.6 |
| 13 | −19.558 | 1.66 | | |
| 14 | −10.925 | 1.44 | 1.83481 | 42.7 |
| 15 | −23.115 | | | |

TABLE 2

| | | | |
|---|---|---|---|
| f | 36.10 | 50.00 | 68.00 |
| fB | 10.19 | 21.54 | 36.22 |
| F No. | 1:4.6 | 1:6.3 | 1:8.5 |
| ω | 30.3° | 23.1° | 17.6° |
| d9 | 7.61 | 4.91 | 3.05 |

The tenth surface of the lens system is aspheric. An aspheric surface is expressed by:

$$X=(CY^2(1+\sqrt{(1+K)C^2Y^2})))+A_4Y^4+A_6Y^6+A_8Y^8+A_{10}A^{10}$$

where X is the distance by which the coordinates at the point on the aspheric surface where the height from the optical axis is Y extend from the tangential plane to the vertex of the aspheric surface; C is the curvature (1/r) of the vertex of the aspheric surface; K is the conic constant; and $A_4$, $A_6$, $A_8$, and $A_{10}$ are the aspheric coefficients of the fourth, sixth, eighth and tenth orders, respectively.

The respective values of the conic constant and the aspheric coefficients are listed in Table 3 below. It is noted that the radius of curvature of the aspheric surface shown in Table 1 is that at the vertex of the aspheric surface.

TABLE 3

| Tenth surface |
|---|
| K = 0.00000000 |
| $A_4$ = 0.76579924 × $10^{-4}$ |
| $A_6$ = 0.18523552 × $10^{-5}$ |
| $A_8$ = −0.10443598 × $10^{-7}$ |
| $A_{10}$ = 0.00000000 |

EXAMPLE 2

Figure 5:
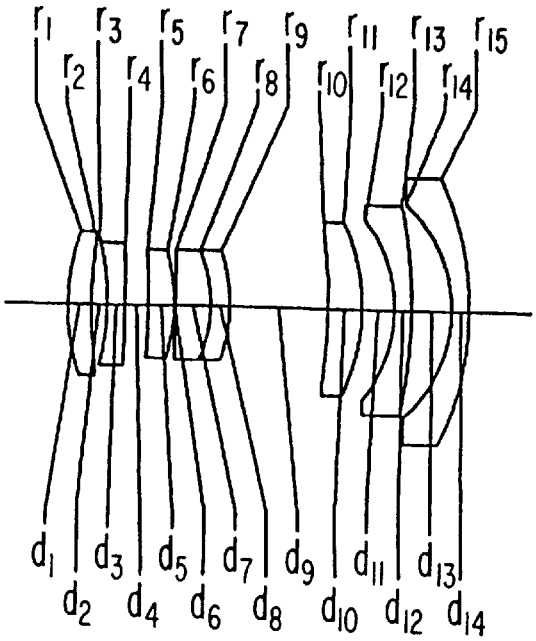
FIG. 5 is a simplified cross-sectional view showing the zoom lens system of Example 2 at the wide-angle end.
Figure 6:
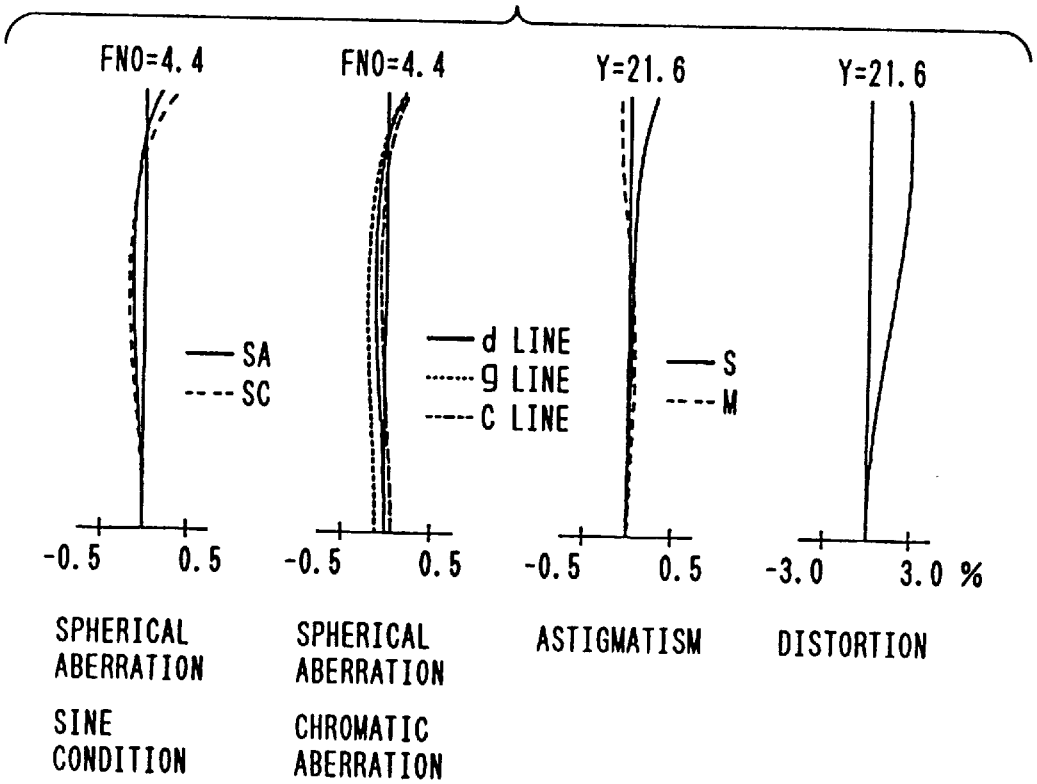
FIG. 6 is a set of graphs plotting the aberration curves obtained with the zoom lens system of Example 2 at the wide-angle end.
Figure 7:
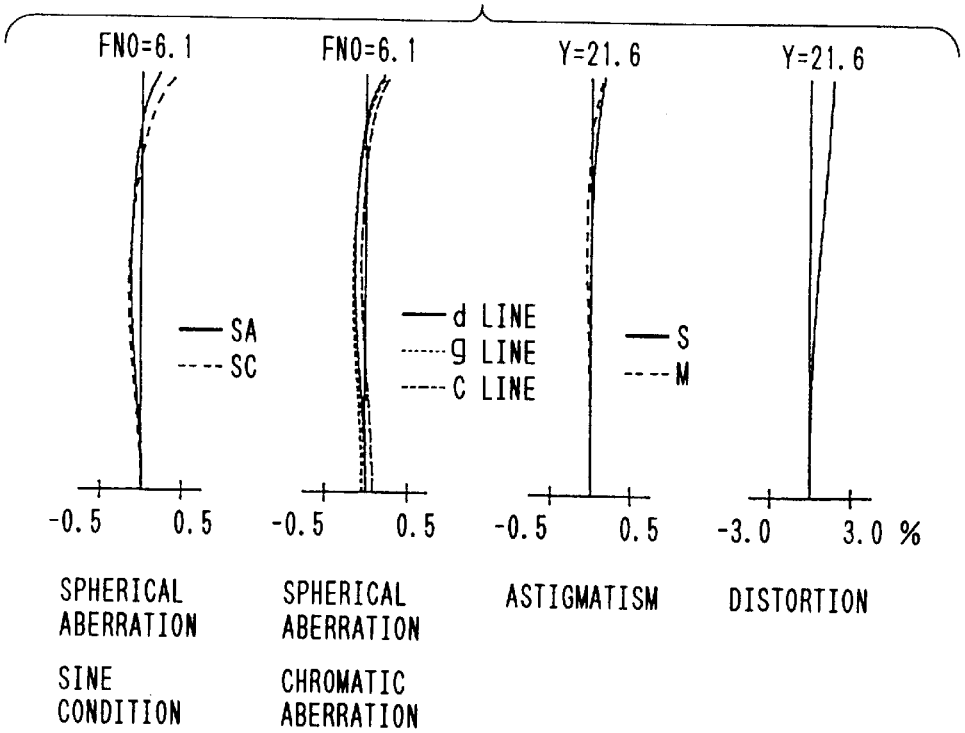
FIG. 7 is a set of graphs plotting the aberration curves obtained with the zoom lens system of Example 2 at the intermediate-angle end.
Figure 8:
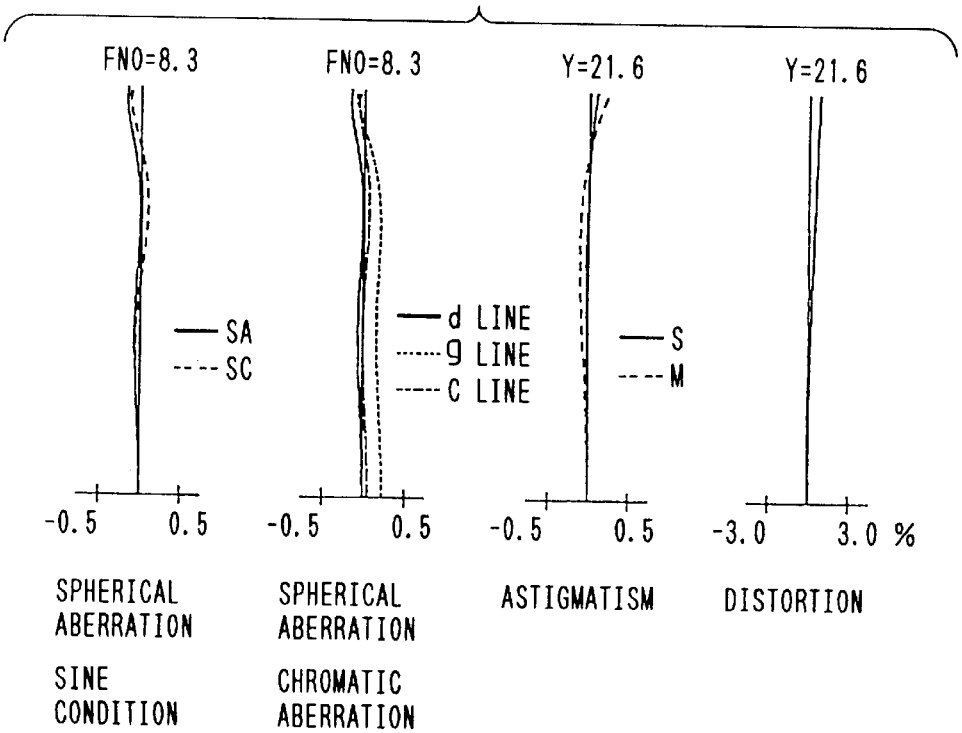
FIG. 8 is a set of graphs plotting the aberration curves obtained with the zoom lens system of Example 2 at the telephoto end.

FIG. 5 illustrates the zoom lens system of Example 2 of the present invention. Specific numerical data for this system are given in Tables 4 and 5. FIG. 8 is a graph plotting the aberration curves obtained with this system at the wide-angle end, the intermediate-angle end, and the telephoto end, respectively.

In Example 2, the fourth and tenth surfaces are aspheric and their aspheric coefficients are listed in Table 6.

TABLE 4

| Surface No. | r | d | n | ν |
|---|---|---|---|---|
| 1 | 16.532 | 1.85 | 1.53172 | 48.9 |
| 2 | 32.843 | 1.28 | | |
| 3 | −18.916 | 1.39 | 1.73077 | 40.5 |
| 4 | −74.920 | 1.79 | | |
| 5 | −66.046 | 2.03 | 1.48749 | 70.2 |
| 6 | −15.222 | 0.10 | | |
| 7 | −317.259 | 2.78 | 1.51633 | 64.1 |
| 8 | −10.337 | 1.48 | 1.84666 | 23.8 |
| 9 | −12.937 | Variable | | |
| 10 | −33.749 | 2.65 | 1.58547 | 29.9 |
| 11 | −15.581 | 2.59 | | |
| 12 | −11.092 | 1.33 | 1.72000 | 50.3 |
| 13 | −38.299 | 3.21 | | |
| 14 | −10.954 | 1.42 | 1.67790 | 50.7 |
| 15 | −23.249 | | | |

TABLE 5

| | | | |
|---|---|---|---|
| f | 36.10 | 50.00 | 68.00 |
| fB | 9.21 | 20.69 | 35.56 |
| F No. | 1:4.4 | 1:6.1 | 1:8.3 |
| ω | 30.3° | 23.1° | 17.5° |
| d9 | 7.93 | 4.97 | 2.93 |

TABLE 6

| Fourth Surface | Tenth Surface |
|---|---|
| K = 0.00000000 | K = 0.00000000 |
| $A_4 = 0.10627284 \times 10^{-3}$ | $A_4 = 0.57738292 \times 10^{-4}$ |
| $A_6 = 0.20889839 \times 10^{-5}$ | $A_6 = -0.12299472 \times 10^{-5}$ |
| $A_8 = -0.78624126 \times 10^{-7}$ | $A_8 = -0.79635417 \times 10^{-8}$ |
| $A_{10} = 0.19229557 \times 10^{-8}$ | $A_{10} = 0.00000000$ |

EXAMPLE 3

Figure 9:
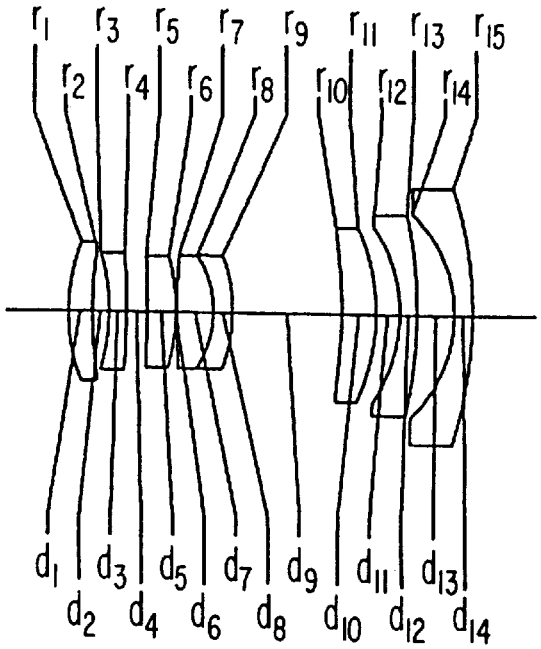
FIG. 9 is a simplified cross-sectional view showing the zoom lens system of Example 3 at the wide-angle end.
Figure 10:
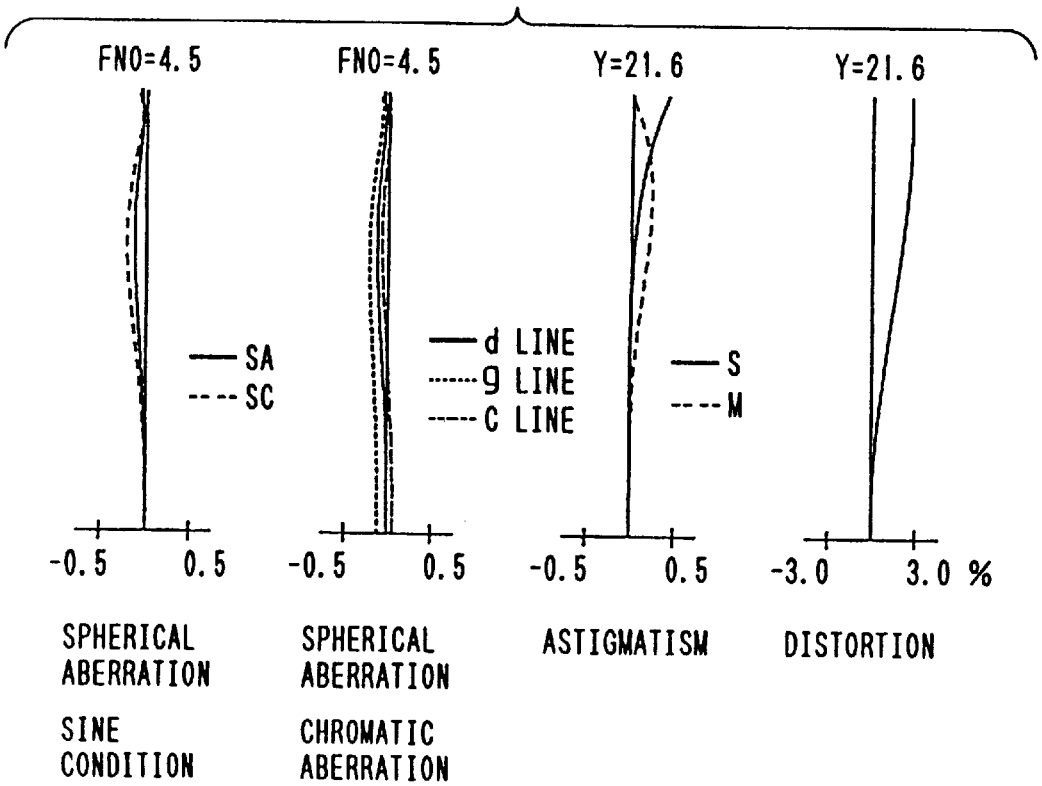
FIG. 10 is a set of graphs plotting the aberration curves obtained with the zoom lens system of Example 3 at the wide-angle end.
Figure 11:
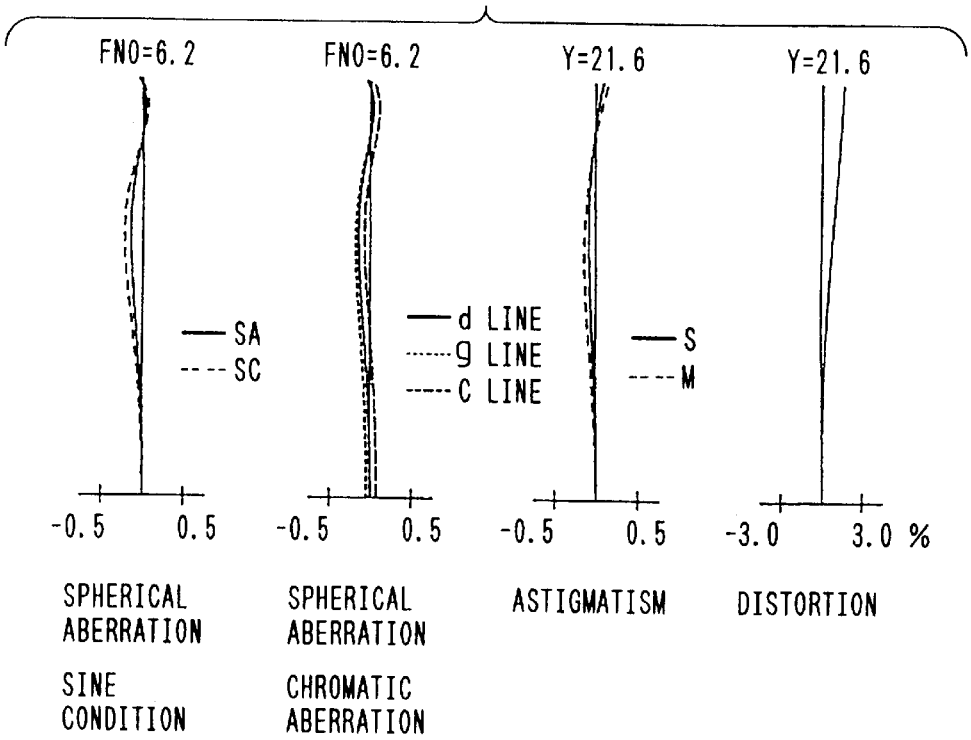
FIG. 11 is a set of graphs plotting the aberration curves obtained with the zoom lens system of Example 3 at the intermediate-angle end.
Figure 12:
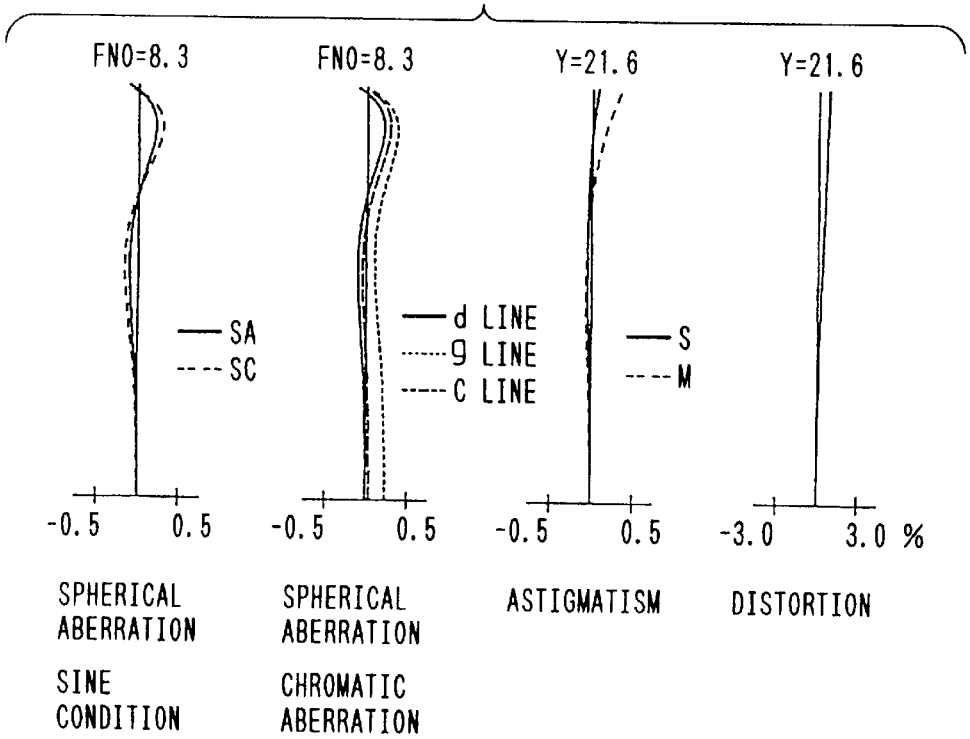
FIG. 12 is a set of graphs plotting the aberration curves obtained with the zoom lens system of Example 3 at the telephoto end.

FIG. 9 illustrates the zoom lens system of Example 3 of the present invention. Numerical data for this system are given in Tables 7 and 8. FIGS. 10–12 are graphs plotting the aberration curves obtained with this system at the wide-angle end, the intermediate-angle end and the telephoto end, respectively.

In Example 3, the fifth and tenth surfaces are aspheric and their aspheric coefficients are listed in Table 9.

TABLE 7

| Surface No. | r | d | n | ν |
|---|---|---|---|---|
| 1 | 14.554 | 1.91 | 1.48749 | 70.2 |
| 2 | 30.328 | 1.36 | | |
| 3 | −14.876 | 1.39 | 1.83400 | 37.2 |
| 4 | −57.405 | 1.65 | | |
| 5 | −92.253 | 2.27 | 1.58913 | 61.2 |
| 6 | −16.453 | 0.10 | | |
| 7 | 73.857 | 2.86 | 1.51454 | 54.7 |
| 8 | −7.967 | 1.49 | 1.83400 | 37.2 |
| 9 | −12.334 | Variable | | |
| 10 | −33.816 | 2.68 | 1.58547 | 29.9 |
| 11 | −16.114 | 1.89 | | |
| 12 | −12.069 | 1.33 | 1.48749 | 70.2 |
| 13 | −37.534 | 2.95 | | |
| 14 | −10.954 | 1.42 | 1.83481 | 42.7 |
| 15 | −32.374 | | | |

TABLE 8

| | | | |
|---|---|---|---|
| f | 36.10 | 50.00 | 68.00 |
| fB | 9.97 | 21.20 | 35.75 |
| F No. | 1:4.4 | 1:6.2 | 1:8.3 |
| ω | 30.3° | 23.1° | 17.5° |
| d9 | 8.60 | 5.67 | 3.66 |

TABLE 9

| Fifth surface | Tenth Surface |
|---|---|
| K = 0.00000000 | K = 0.00000000 |
| $A_4 = -0.52927814 \times 10^{-4}$ | $A_4 = 0.72478854 \times 10^{-4}$ |
| $A_6 = 0.69987984 \times 10^{-6}$ | $A_6 = 0.18865377 \times 10^{-6}$ |
| $A_8 = -0.68925287 \times 10^{-7}$ | $A_8 = 0.54614578 \times 10^{-8}$ |
| $A_{10} = 0.23745056 \times 10^{-8}$ | $A_{10} = 0.00000000$ |

EXAMPLE 4

Figure 13:
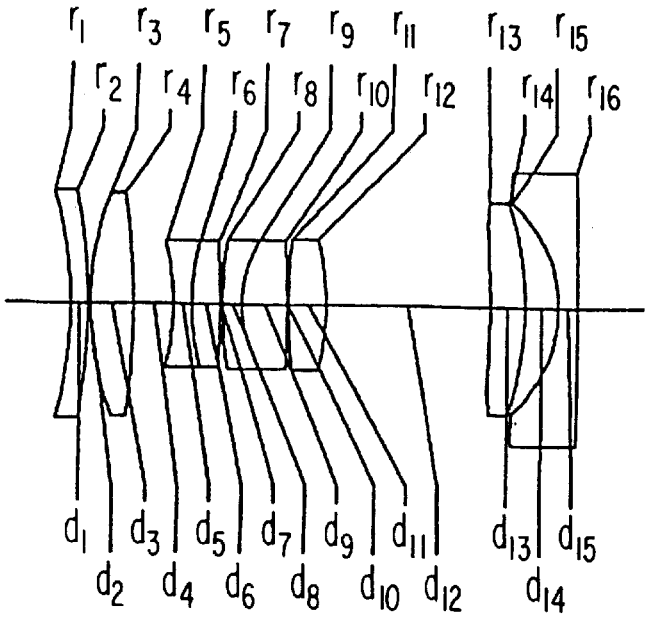
FIG. 13 is a simplified cross-sectional view showing the zoom lens system of Example 4 at the wide-angle end.
Figure 14:
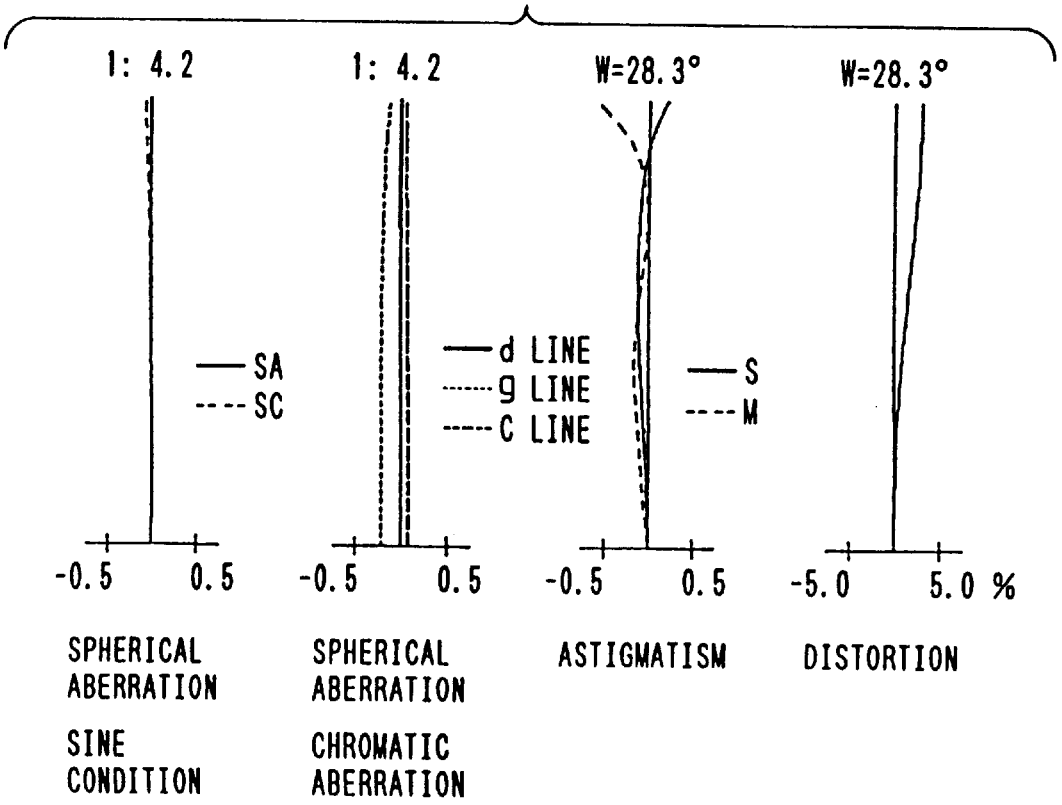
FIG. 14 is a set of graphs plotting the aberration curves obtained with the zoom lens system of Example 4 at the wide-angle end.
Figure 15:
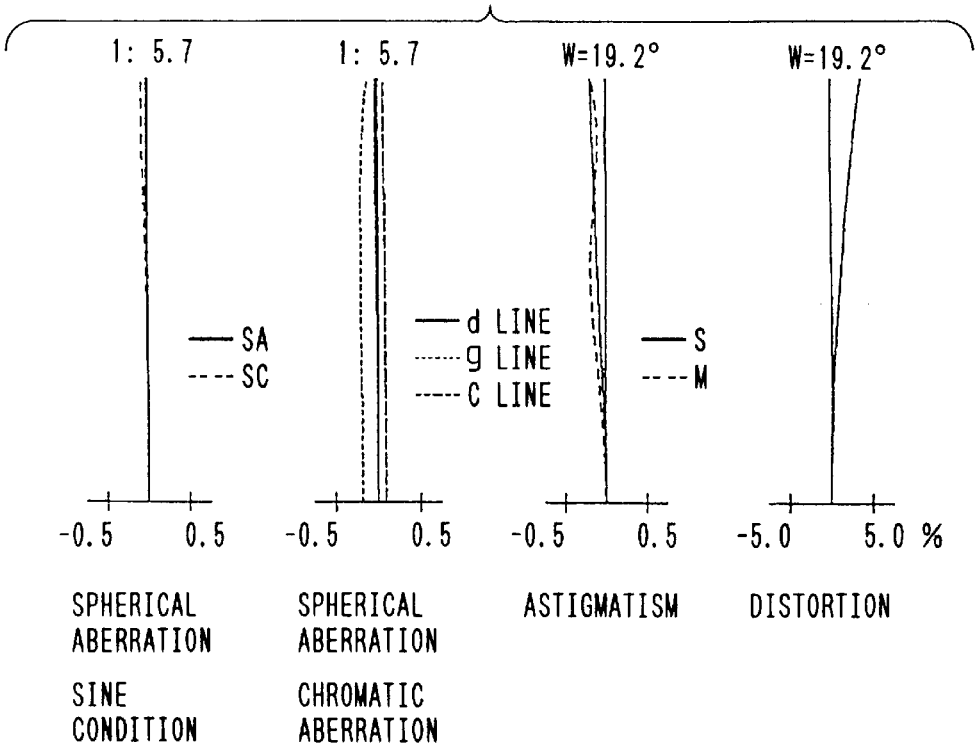
FIG. 15 is a set of graphs plotting the aberration curves obtained with the zoom lens system of Example 4 at the intermediate-angle end.
Figure 16:
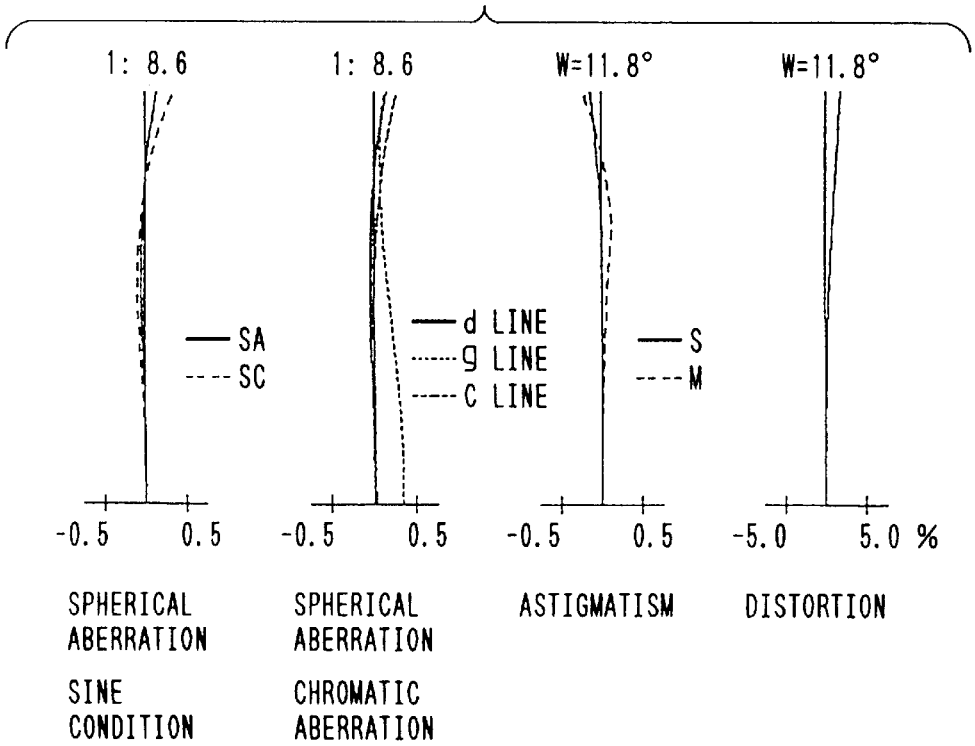
FIG. 16 is a set of graphs plotting the aberration curves obtained with the zoom lens system of Example 4 at the telephoto end.

FIG. 13 illustrates the zoom lens system of Example 4 of the present invention. Numerical data for this system are given in Tables 10 and 11. FIGS. 14–16 are graphs plotting the aberration curves obtained with this system at the wide-angle end, the intermediate-angle end and the telephoto end, respectively.

In Example 4, the twelfth and thirteenth surfaces are aspheric and their aspheric coefficients are listed in Table 12.

TABLE 10

| Surface No. | r | d | n | ν |
|---|---|---|---|---|
| 1 | −32.662 | 1.30 | 1.84666 | 23.8 |
| 2 | −50.643 | 0.20 | | |
| 3 | 23.873 | 3.23 | 1.51112 | 60.5 |
| 4 | −66.642 | variable | | |
| 5 | −17.642 | 1.40 | 1.83481 | 42.7 |
| 6 | 17.642 | 2.18 | 1.72825 | 28.5 |
| 7 | −290.344 | 0.20 | | |
| 8 | 35.405 | 1.50 | 1.60342 | 38.0 |
| 9 | 9.464 | 3.51 | 1.62299 | 58.1 |
| 10 | −217.610 | 0.20 | | |
| 11 | 53.188 | 2.93 | 1.58913 | 61.2 |
| 12 | −17.646 | variable | | |
| 13 | −65.727 | 2.67 | 1.58547 | 29.9 |
| 14 | −26.395 | 2.61 | | |
| 15 | −10.955 | 1.50 | 1.69680 | 55.5 |
| 16 | −768.581 | | | |

TABLE 11

| | | | |
|---|---|---|---|
| f | 39.10 | 60.00 | 102.00 |
| fB | 11.27 | 25.45 | 53.20 |
| F No. | 1:4.2 | 1:5.7 | 1:8.6 |
| ω | 28.3° | 19.2° | 11.8° |
| d4 | 3.11 | 7.55 | 11.56 |
| d12 | 12.90 | 7.59 | 2.81 |

TABLE 12

| Twelfth Surface | Thirteenth Surface |
|---|---|
| K = 0.00000000 | $K = -0.10000000 \times 10$ |
| $A_4 = 0.63008500 \times 10^{-4}$ | $A_4 = 0.80292056 \times 10^{-4}$ |
| $A_6 = -0.51675400 \times 10^{-7}$ | $A_6 = -0.10800984 \times 10^{-7}$ |
| $A_8 = 0.10559300 \times 10^{-8}$ | $A_8 = 0.40301527 \times 10^{-8}$ |
| $A_{10} = 0.00000000$ | $A_{10} = 0.00000000$ |

TABLE 13

| | Ex.1 | Ex. 2 | Ex. 3 | Ex. 4 |
|---|---|---|---|---|
| $f_p$ | 49.8 | 46.9 | 49.8 | 73.5 |
| $f_t/f_p$ | 1.37 | 1.45 | 1.37 | 1.39 |
| $m_2$ | 3.28 | 3.15 | 3.13 | — |
| $m_3$ | — | — | — | 3.56 |
| $m_p' - m_p$ | 0.89 | 1.04 | 0.96 | 0.83 |

As described above, the present invention provides a compact zoom lens system by effectively using a plastic lens. Further, in the present invention, as compared to a system having only glass lenses, the focus shift occurring as a result of environmental changes such as, for example, temperature and humidity, is substantially reduced.

Although the present invention has been fully described by way of the examples thereof with reference to the accompanying drawings, various changes and modifications will be apparent to those having skill in this field without department from the scope of the invention as defined in the appended claims.

What is claimed is:

1. A zoom lens system, comprising:

a positive lens group and a negative lens group, one of which includes a positive plastic lens element; and means for adjusting a magnification of said zoom lens system by varying a distance between said positive and negative lens groups, said zoom lens system satisfying the following conditions:

$$0.9<f_t/f_p<1.6 \quad [(1)]$$

$$0.6<m_p'-m_p<1.2$$

$$[2.9<] \; 3.13 \leqq m_{MAX}<4.0$$

where $f_t$ is the focal length of the overall system at the telephoto end;

$f_p$ is the focal length of the positive plastic lens element;

$m_p$ is the lateral magnification at the telephoto end of the lens group which includes the positive plastic lens element and which is positioned closer to an image than said positive plastic lens element;

$m_p'$ is the lateral magnification at the telephoto end of the lens group which does not include the positive plastic lens element and which is positioned closer to the image than said positive plastic lens element; and $m_{MAX}$ is the lateral magnification at the telephoto end of the lens group having a maximum magnification.

2. A zoom lens system according to claim 1, wherein said negative lens group includes said positive plastic lens element.

3. A zoom lens system, comprising:

in order from the object side, a positive first lens group and a negative second lens group having a positive plastic lens element; and means for adjusting a magnification of said zoom lens system by varying a distance between the first and second lens groups, said zoom lens system satisfying the following conditions:

$$0.9<f_t/f_p<1.6 \quad [(1)]$$

$$0.6<m_p'-m_p<1.2 \quad [(2)]$$

$$[2.9<] \; 3.13 \leqq m_2<3.7 \quad [(4)]$$

where $f_t$ is the focal length of the overall system at the telephoto end;

$f_p$ is the focal length of the positive plastic lens element;

$m_p$ is the lateral magnification at the telephoto end of the lens group which includes the positive plastic lens element and which is positioned closer to the image than said positive plastic lens element;

$m_p'$ is the lateral magnification at the telephoto end of the lens group which does not include the positive plastic lens element and which is positioned closer to the image than said positive plastic lens element; and $m_2$ is the lateral magnification of the second lens group having a maximum magnification at the telephoto end.

4. A zoom lens system according to claim 3, wherein said positive plastic lens element is positioned closest to the object relative to lens elements forming said second lens group.

*5. The zoom lens system of claim 1, said zoom lens system consisting of said positive lens group and said negative lens group.*

*6. The zoom lens system of claim 3, said zoom lens system consisting of said first positive lens croup and said second negative lens group.*

*7. A zoom lens system, said zoom lens system consisting of a positive lens group and a negative lens group;*

*one of positive lens group and said negative lens group including a positive plastic lens element; and*

*means for adjusting a magnification of said zoom lens system by varying a distance between said positive lens group and said negative lens group, said zoom lens system satisfying the following conditions:*

$$0.9<f_t/f_p<1.6$$

$$0.6<m_p'-m_p<1.2$$

$$2.9<m_{MAX}<4.0$$

*where*

*$f_t$ is the focal length of the overall system at the telephoto end;*

*$f_p$ is the focal length of the positive plastic lens element;*

*$m_p$ is the lateral magnification at the telephoto end of the lens group which includes the positive plastic lens element and which is positioned closer to an image than said positive plastic lens element;*

*$m_p'$ is the lateral magnification at the telephoto end of the lens group which does not include the positive plastic lens element and which is positioned closer to the image than said positive plastic lens element; and*

*$m_{MAX}$ is the lateral magnification at the telephoto end of the lens group having a maximum magnification.*

*8. The zoom lens system according to claim 7, wherein said negative lens group includes said positive plastic lens element.*

*9. A zoom lens system, said zoom lens system consisting of, in order from an object side, a positive lens group and a negative lens group having a positive plastic lens element; and*

*means for adjusting a magnification of said zoom lens system by varying a distance between said positive lens group and said negative lens group, said zoom lens system satisfying the following conditions:*

$$0.9<f_t/f_p<1.6$$

$$0.6<m_p'-m_p<1.2$$

$$2.9<m_p'<3.7$$

*where*

$f_t$ *is the focal length of the overall system at the telephoto end;*

$f_p$ *is the focal length of the positive plastic lens element;*

$m_p$ *is the lateral magnification at the telephoto end of said negative lens croup which includes the positive plastic lens element and which is positioned closer to an image than said positive plastic lens element;*

$m_p'$ *is the lateral magnification at the telephoto end of said positive lens group which does not include the positive plastic lens element and which is positioned closer to the image than said positive plastic lens element; and*

$m_{MAX}$ *lateral magnification, at the telephoto end, of said negative lens group having a maximum magnification.*

*10. The zoom lens system according to claim 9, wherein said positive plastic lens element is positioned closest to the object, relative to lens elements forming said negative lens group.*

* * * * *